Jan. 29, 1952     R. BERNHARDT     2,583,808
MEASURING CUP
Filed Jan. 12, 1949
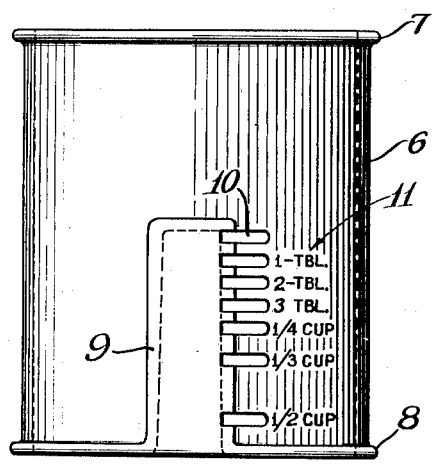
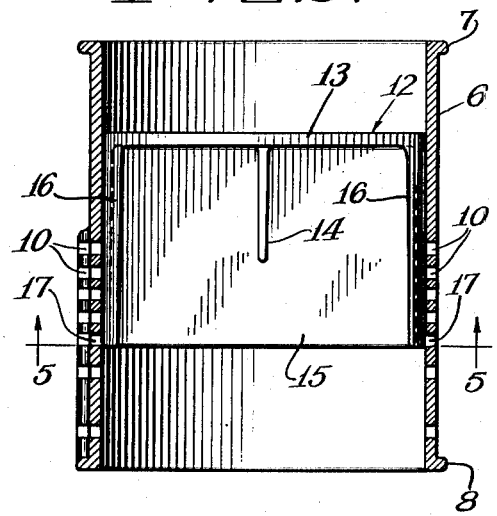
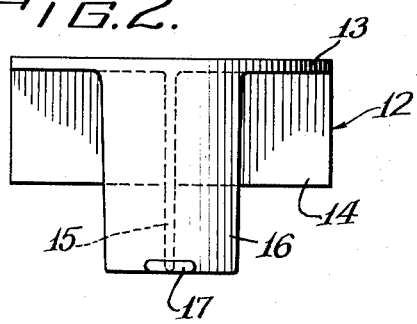
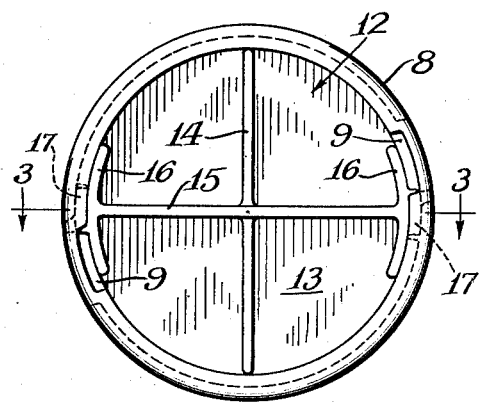
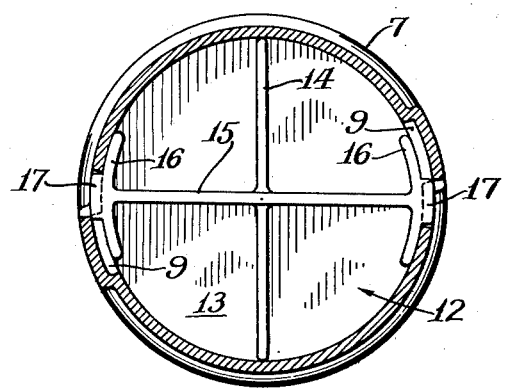
Inventor:
Rudolph Bernhardt
By Glenn S. Noble
Atty.

Patented Jan. 29, 1952

2,583,808

UNITED STATES PATENT OFFICE 2,583,808

MEASURING CUP

Rudolph Bernhardt, Chicago, Ill.

Application January 12, 1949, Serial No. 70,556

3 Claims. (Cl. 73—429)

This invention relates to measures for measuring various commodities but is particularly intended to be used as a shortening measure. Heretofore shortening, such as used in domestic cooking, has usually been measured by pressing it into a measuring cup, but such operation is more or less troublesome and it is difficult to remove the shortening from such cup. This tends to make the measuring uncertain. Shortening which may consist of any of the different materials commonly used for such purposes as, for instance, lard, Crisco, oleomargarine, or the like, is usually of a viscous character.

The principal object of the present invention is to provide a new measure for readily and conveniently measuring shortening or other materials.

Other objects are to provide a measure of the character indicated which will be of simple construction and consisting of only two parts which may be molded of any suitable plastic; to provide a measure which may be easily filled and which may be adjusted for different quantities of material; and to provide such other advantages and desirable features as will be pointed out more particularly hereinafter.

In the accompanying drawings illustrating this invention,

Fig. 1 is a side view of the cylindrical container;

Fig. 2 is a similar view of the adjustable and removable bottom or closure;

Fig. 3 is a longitudinal view showing the bottom in adjusted position and taken substantially on the line 3—3 of Fig. 4;

Fig. 4 is a bottom plan view of the measure; and

Fig. 5 is a sectional view taken substantially on the line 5—5 of Fig. 3.

The cylindrical member 6 is provided with beads or flanges 7 and 8 at the top and bottom. Channels or guideways 9 extend upwardly from the bottom and terminate about halfway up the sides of the cylindrical member. A plurality of holes or slots 10 are formed along the sides of these guideways, these slots extending through the side walls of the guideways and a short distance into the adjacent body of the cylindrical member. A scale 11 of any desired indicia for denoting either weight or measure is arranged along these openings in order to properly position the adjustable bottom for the desired amount of shortening. The adjustable bottom 12 comprises a disc 13 which fits closely within the cylindrical member 6. This disc is strengthened by a downwardly extending transverse wall 14 and a combined wall and hand hold 15 which is arranged at 90° to the first named wall. The outer ends of the wall 15 are provided with curved guides or flanges 16 which also fit closely within the cylindrical member 6. Lugs 17 extend outwardly from the lower ends of the guides 16 as shown particularly in Figs. 2 and 3. These lugs slidably engage with the channels or guideways 9 when the adjustable bottom 12 is inserted in the lower end of the cylindrical member and serve to limit the upward movement thereof. When the lugs 17 are adjusted to engage with any pair of oppositely disposed slots 10, the adjustable bottom may be turned until the lugs engage with such slots to hold the adjustable bottom in adjusted position. By selecting the capacity markings on the sides of the cylindrical member, the adjustable bottom may be adjusted to give any desired quantity or measurement within the capacities of the measure.

The two parts of the measure may be readily molded by means of an injection molding machine and by selecting suitable plastic will have a pleasing appearance. If desired, the inner or adjustable bottom portion may be made of a different color than the cylindrical member in order to enhance the attractive appearance. The measure is not intended to be used for liquids but is adapted for measuring solid, semi-solid, or viscous materials.

When the measure is to be used, the movable bottom is adjusted for the desired capacity as indicated by the capacity markings on the measure. The measure is then filled by putting the shortening in the top which may be done by means of any convenient tool and leveled off to give the exact quantity. Then by releasing the adjustable bottom and pressing it toward the top, it will act as a piston to eject all of the material from the measure, the arrangement being such that when the bottom has reached its uppermost movement, it will be flush with the top of the cylindrical member and all of the shortening may be readily removed therefrom.

It will be apparent that the measure may be made of various sizes and changes may be made in the construction thereof in order to adapt the same for different materials without departing from the following claims in which I claim:

1. A measure consisting of a hollow cylindrical member having channel-shaped guideways opening into the hollow cylindrical member and extending upwardly from the bottom on opposite sides thereof and terminating about half-way up the hollow cylindrical member and said hollow cylindrical member having a plurality of vertically spaced slots adjacent to the guideways and opening into the sides of the guideways, an adjustable bottom consisting of a disc adapted to be slidably mounted in the hollow cylindrical member and having oppositely disposed downwardly extending guides and a hand hold, and lugs projecting outwardly from the guides adapted to enter into the lower ends of the guideways and to slidably engage with said guideways and to register with the oppositely disposed slots for holding the adjustable bottom in adjusted positions.

2. In a measuring device, the combination of a hollow cylinder formed of plastic material with open ends and having an integrally formed channel shaped guideway extending outwardly and upwardly from the bottom thereof, and a plurality of vertically arranged spaced apart slots along one side of the guideway which enter into the side of the guideway, a movable bottom fitting closely within the cylinder which has a downwardly extending transverse wall and a combined wall and hand hold which is arranged at 90° to the first named wall, the outer ends of the hand hold being provided with curved guides which fit closely within the container and provided with a lug adapted to register with said guideway and to be turned to engage with the slots for regulating the capacity of the measure, said slots having capacity markings for indicating the capacity of the measure when the lug is in engagement with the corresponding slot, the arrangement being such that the bottom and parts associated therewith may be inserted at the bottom of the cylinder and the inward movement will be limited by the guideway.

3. A measuring cup for measuring shortening or the like, consisting of a hollow cylinder open at the top and bottom with channels extending outwardly from the walls on opposite sides and terminating substantially midway between the ends of the cylinder, a plurality of slots formed in the walls of the cylinder and opening into the side walls of the channels, a scale for indicating capacity arranged along the slots, an adjustable bottom comprising a disk which fits closely within the hollow cylinder and has a downwardly extending transverse rib and a combined rib and hand hold arranged at right angles to the first named rib, curved guides at the ends of the last named rib which fit closely within the hollow cylinder, and lugs extending outwardly from the guides, said lugs being adapted to engage with the channels when the adjustable bottom is inserted through the lower end of the cylinder and which may be rotated to engage with the slots to position the adjustable bottom in accordance with the desired capacity for the measure.

RUDOLPH BERNHARDT.

REFERENCES CITED

The following references are of record in the file of this patent:

UNITED STATES PATENTS

| Number | Name | Date |
|---|---|---|
| 713,688 | Sansone et al. | Nov. 18, 1902 |
| 1,508,548 | Gottheimer | Sept. 16, 1924 |
| 2,158,704 | Ligon | May 16, 1939 |
| 2,256,865 | Gilbert | Sept. 23, 1941 |

FOREIGN PATENTS

| Number | Country | Date |
|---|---|---|
| 273,226 | Italy | Mar. 31, 1930 |